(12) United States Patent
Camp et al.

(10) Patent No.: US 9,095,945 B2
(45) Date of Patent: Aug. 4, 2015

(54) AUTOMATED STEERING CENTERING ASSEMBLY

(71) Applicant: Honda Motor Co., Ltd., Tokyo (JP)

(72) Inventors: Greg Camp, Anniston, AL (US); Alan Rainwater, Childersburg, AL (US); Mark Grimes, Centre, AL (US)

(73) Assignee: Honda Motor Co., Ltd., Tokyo (JP)

( * ) Notice: Subject to any disclaimer, the term of this patent is extended or adjusted under 35 U.S.C. 154(b) by 338 days.

(21) Appl. No.: 13/893,552

(22) Filed: May 14, 2013

(65) Prior Publication Data

US 2014/0338436 A1   Nov. 20, 2014

(51) Int. Cl.
*G01B 5/00*   (2006.01)
*B23Q 3/18*   (2006.01)
*B23Q 3/12*   (2006.01)
*B62D 1/00*   (2006.01)

(52) U.S. Cl.
CPC .............. *B23Q 3/183* (2013.01); *B23Q 3/12* (2013.01); *B62D 1/00* (2013.01); *G01B 5/0025* (2013.01); *B23Q 2703/04* (2013.01); *Y10T 279/1208* (2015.01); *Y10T 279/1224* (2015.01)

(58) Field of Classification Search
CPC ...... B23Q 2703/04; B23Q 3/12; B23Q 3/183; G01B 5/0025; G01B 11/275; G01B 2210/283
USPC .......................................... 33/600, 644, 645
See application file for complete search history.

(56) References Cited

U.S. PATENT DOCUMENTS

| 4,893,413 | A | * | 1/1990 | Merrill et al. ................... 33/371 |
| 5,105,546 | A |   | 4/1992 | Weise et al. |
| 6,918,327 | B2 |  | 7/2005 | Ayrton |
| 7,318,287 | B1 |  | 1/2008 | Hatfield et al. |
| 7,841,605 | B1 | * | 11/2010 | Morgan ..................... 280/89.11 |
| 8,327,699 | B2 |  | 12/2012 | Ellis et al. |
| 2003/0159303 | A1 | * | 8/2003 | Crawford ........................ 33/645 |
| 2004/0016309 | A1 | * | 1/2004 | Catala Garcia et al. ........ 33/600 |
| 2012/0311963 | A1 |  | 12/2012 | Fukuda et al. |
| 2013/0318809 | A1 | * | 12/2013 | Drasovean ...................... 33/701 |
| 2014/0338436 | A1 | * | 11/2014 | Camp et al. ................ 73/117.02 |

FOREIGN PATENT DOCUMENTS

JP    5193538    8/1993

* cited by examiner

*Primary Examiner* — Yaritza Guadalupe-McCall
(74) *Attorney, Agent, or Firm* — Rankin, Hill & Clark LLP (57) ABSTRACT

An automated vehicle steering centering assembly for a centering process for marking a center of a steering column includes a housing connected to a robotic arm for movement therewith. A drive mechanism is mounted to the housing. A chuck is rotatably connected to the drive mechanism. The chuck includes a moveable gripper jaw having a splined inner surface for mating with a splined portion of the steering column. A pneumatic mechanism is mounted to the housing and operably connected to the chuck. Air pressure supplied from the pneumatic mechanism to the chuck moves the gripper jaw between an open position and a closed position so as to grip the steering column.

20 Claims, 8 Drawing Sheets

AUTOMATED STEERING CENTERING ASSEMBLY

BACKGROUND

During the manufacture of vehicles, it is common to mark a steering column to indicate the neutral position or center position of the steering column. Placement of such a mark on the steering column permits an associate to subsequently orient the steering wheel such that the steering wheel is positioned in a neutral rotary orientation (i.e., not turned left or right) when the vehicle is traveling straight ahead. Typically, such a steering column alignment mark is made on the steering column with the assistance of an automated machine that is moved into position on the steering column by the associate. A known automated machine includes a gearbox operably connected to an articulating arm that is moveable by the associate. The gearbox includes an attachment socket having a splined inner surface for mating with a splined portion of the steering column.

With the use of the splined socket, an exact alignment by the associate of the automated machine with the steering column is required. Further, it sometimes occurs that the automated machine used to mark the steering column is not operating correctly. In this situation, the mark is improperly positioned on the steering column, and this ultimately leads to a steering wheel that is misaligned relative to the steering column. A misaligned steering wheel will appear to be turned left or right when the steering column is neutral or centered.

BRIEF DESCRIPTION

In accordance with one aspect, an automated vehicle steering centering assembly for a centering process for marking a center of a steering column comprises a housing connected to an associated robotic arm for movement therewith. A drive mechanism is mounted to the housing. A chuck is rotatably connected to the drive mechanism. The chuck includes a moveable gripper jaw having a splined inner surface for mating with a splined portion of the steering column. A pneumatic mechanism is mounted to the housing and operably connected to the chuck. Air pressure supplied from the pneumatic mechanism to the chuck moves the gripper jaw between an open position and a closed position so as to grip the steering column.

In accordance with another aspect, an automated vehicle steering centering assembly for a centering process for marking a center of a steering column comprises a robotic arm and a housing connected to the robotic arm for movement therewith. A drive mechanism is mounted to the housing. A chuck is rotatably connected to the drive mechanism. The chuck includes at least two moveable gripper jaws each having a splined inner surface for mating with a splined portion of the steering column. A pneumatic mechanism is mounted to the housing and operably connected to the chuck. The pneumatic mechanism includes a first driver pulley operably coupled to the chuck and a second driven pulley mounted on an air shaft and rotatably coupled to the first pulley. Air pressure supplied from the pneumatic mechanism to the chuck moves each gripper jaw between an open position and a closed position which allows the gripper jaws to engage the steering column.

In accordance with yet another aspect, a method of automatically centering a steering column of a vehicle comprises moving an automated centering assembly toward the steering column. The centering assembly includes the chuck having at least two moveable gripper jaws each having a splined inner surface for mating with a splined portion of the steering column, the drive mechanism for rotating the chuck, and the pneumatic mechanism for moving each gripper jaw between an open position and a closed position. The method comprises positioning the chuck on the steering column; rotating the chuck together with the steering column in both a clockwise direction and a counterclockwise direction; detecting the clockwise and counterclockwise rotations of the chuck; and calculating a center of a steering span of the steering column.

DETAILED DESCRIPTION

It should, of course, be understood that the description and drawings herein are merely illustrative and that various modifications and changes can be made in the structures disclosed without departing from the present disclosure. In general, the figures of the exemplary automated steering centering assembly are not to scale. For purposes of understanding, the term "signal" utilized herein is defined as any electrical signal or any stored or transmitted value. For example, a signal can comprise a voltage, or a current. Further, a signal can comprise any stored or transmitted value such as binary values, scalar values, or the like. It will also be appreciated that the various identified components of the exemplary automated steering centering assembly disclosed herein are merely terms of art that may vary from one manufacturer to another and should not be deemed to limit the present disclosure.

Figure 1:
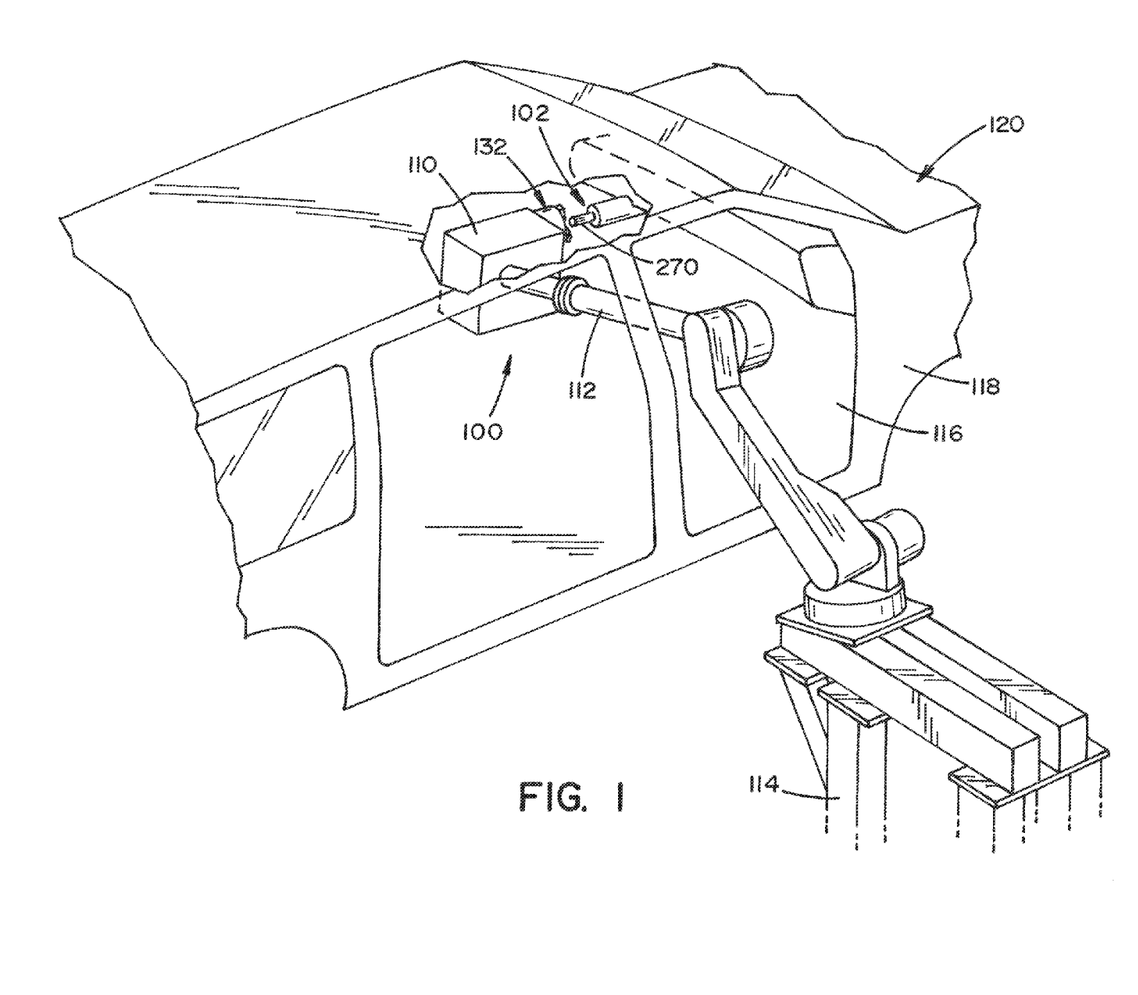
FIG. 1 is a perspective view of an automated vehicle steering centering assembly for a centering process for marking a center of a steering column.

Referring now to the drawings, wherein like numerals refer to like parts throughout the several views, FIG. 1 illustrates an automated vehicle steering centering assembly 100 for marking a center of a steering column 102. The centering assembly 100 can include a housing 110 connected to an end portion of a robotic arm 112 for movement therewith. The robotic arm 112 can be mounted on a frame 114 which is located in a vehicle body assembly line. As shown, the robotic arm 112 extends through a door opening 116 provided on a passenger side panel 118 of a vehicle body 120. The robotic arm 112 is controllable to automatically align the centering assembly 100 with the steering column 102 during the centering process for marking a center of the steering column. Although the robotic arm 112 is depicted as extending through the door opening 116, it should be appreciated that this is by way of example only and that the present disclosure is not limited thereto.

Figure 2:
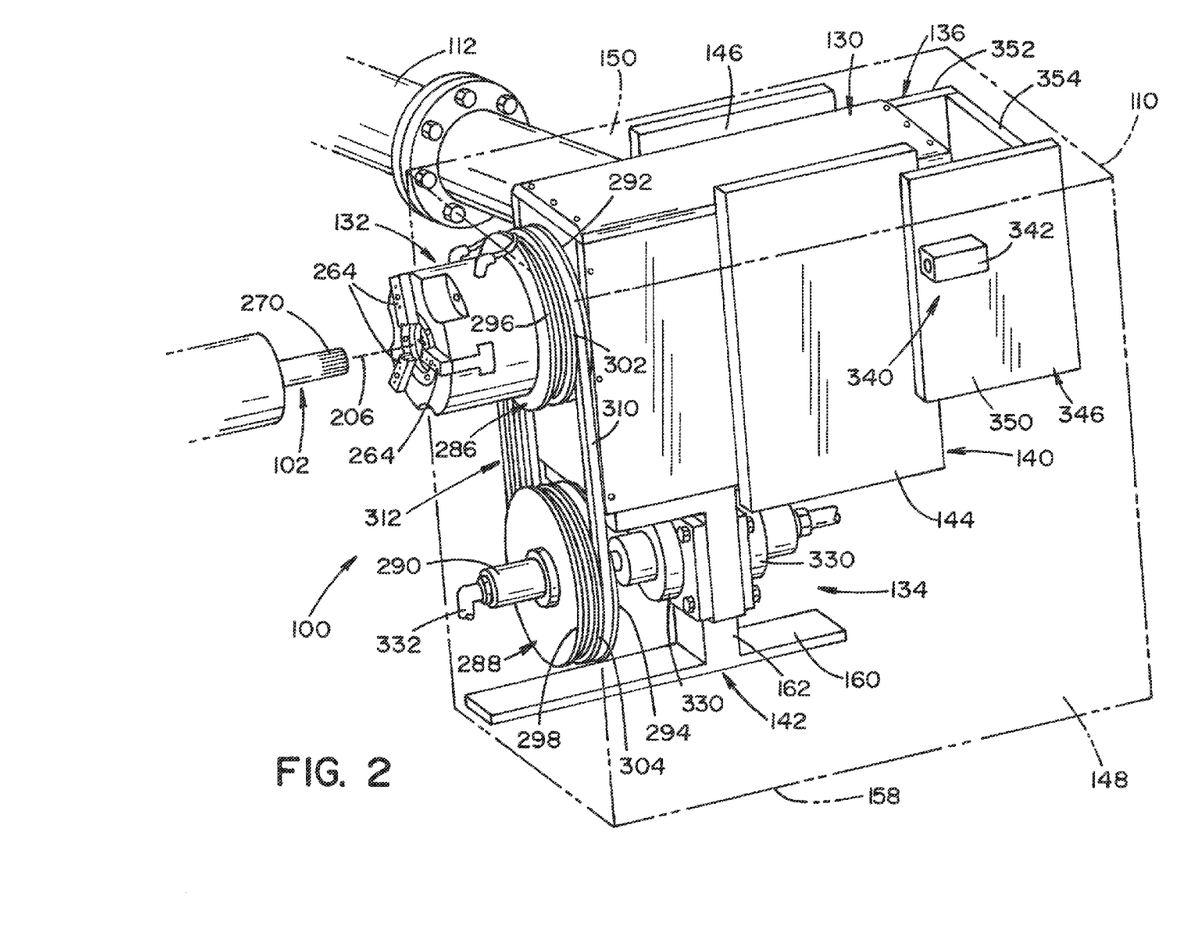
FIG. 2 is a perspective view of a drive mechanism, a chuck, and a pneumatic mechanism of the centering assembly of FIG. 1.
Figure 3:
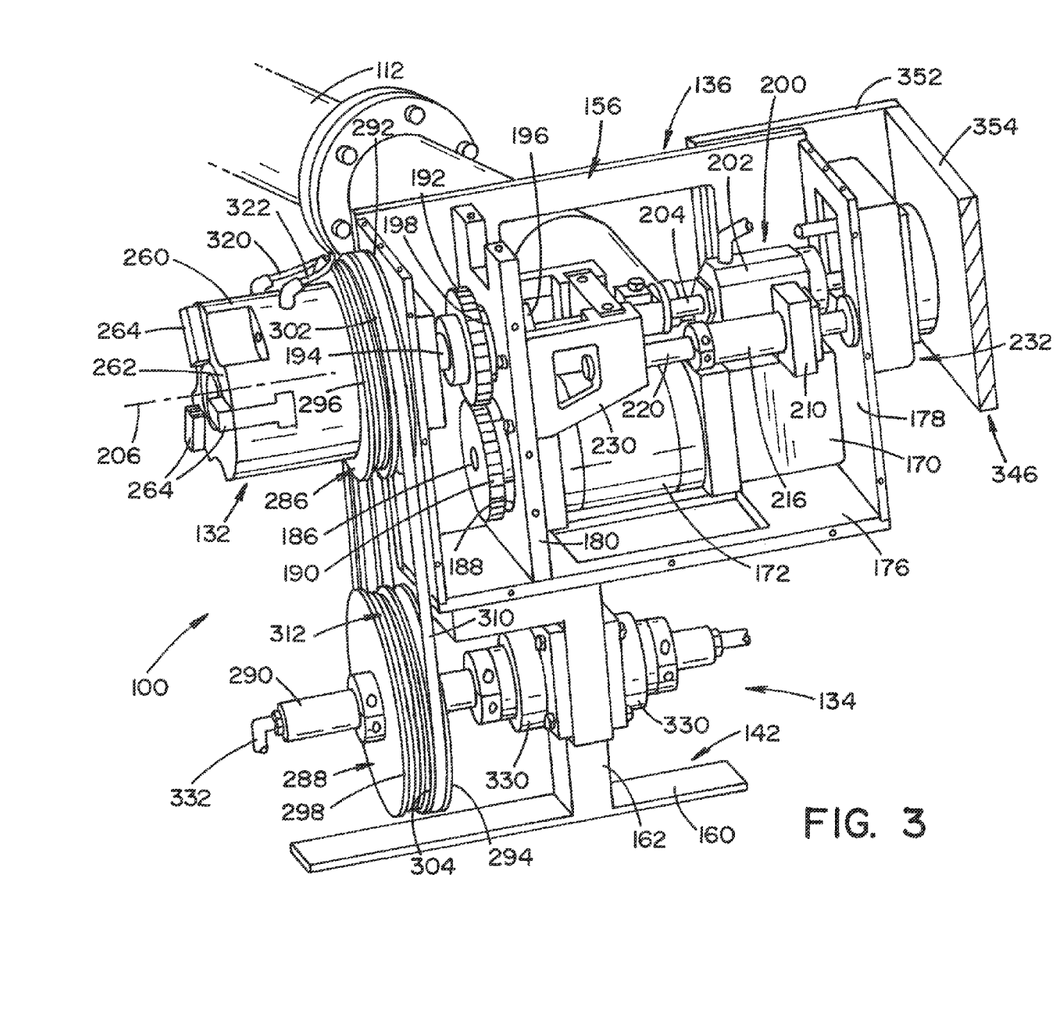
FIG. 3 is a perspective view of FIG. 2 showing the components of the drive mechanism.
Figure 4:
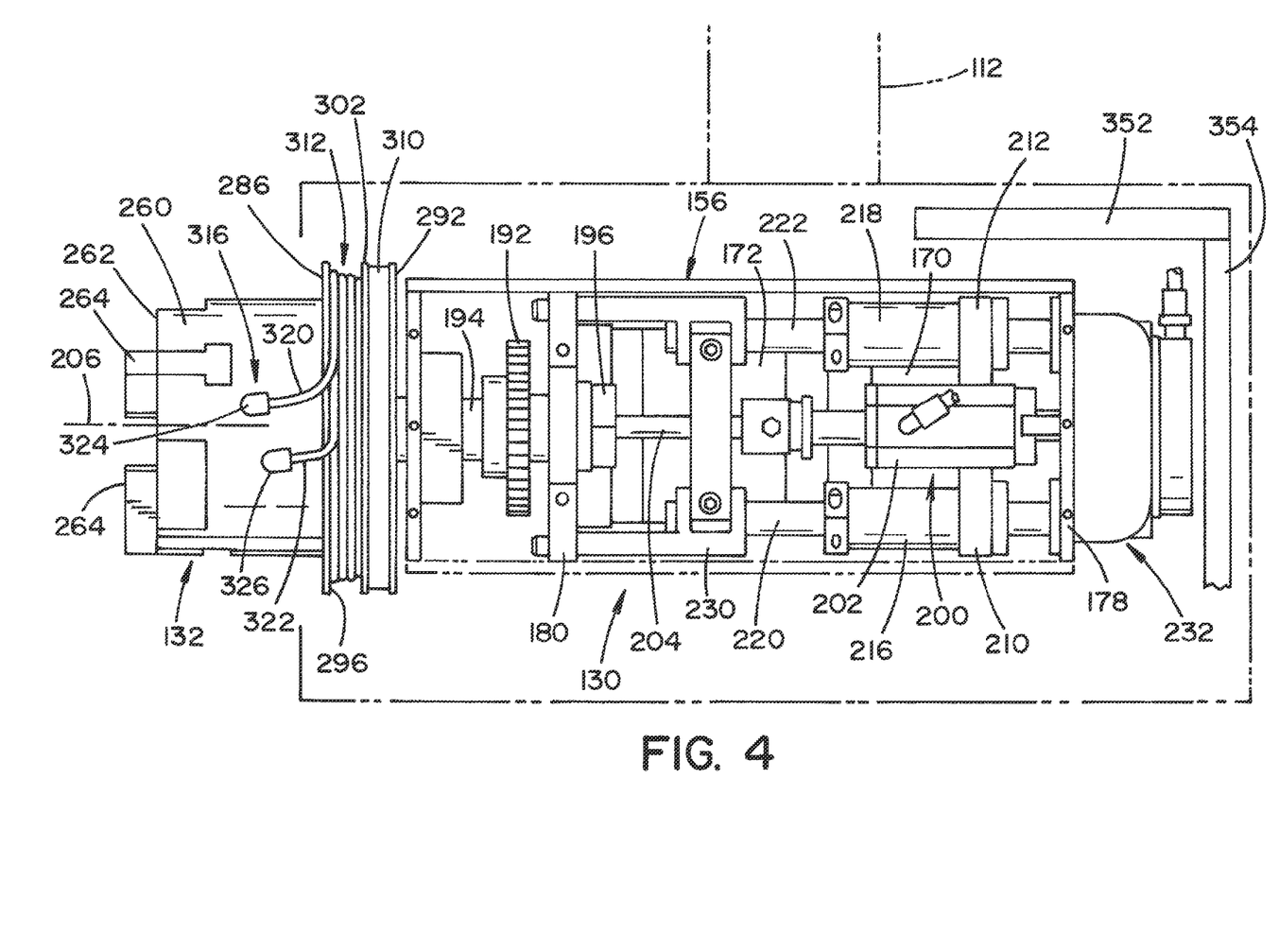
FIG. 4 is a top view of the components of the drive mechanism of FIG. 3.

With reference to FIGS. 2-4, the automated vehicle steering centering assembly 100 includes a drive mechanism 130 which can be mounted to or housed in the housing 110, a chuck 132 rotatably connected to the drive mechanism 130, and a pneumatic mechanism 134 which can be mounted to the housing 110 and is operatively connected to the chuck 132. In the depicted embodiment, a frame 136 can be associated with the housing 110 and can be adapted to secure the drive mechanism 130 and pneumatic mechanism 134 within the housing 110. It should be appreciated that in lieu of the housing 110, the frame 136 can be mounted to the end portion of the robotic arm 112. As shown, the frame 136 has a first frame part 140 mounted to the drive mechanism 130 and a second frame part 142 mounted to the pneumatic mechanism 134. The first frame part 136 includes spaced frame members 144, 146 which can be connected to respective sidewalls 148, 150 of the housing 110. A sub-housing 156 for housing components of the drive mechanism 130 is sandwiched between the frame members 144, 146 and can be secured to the frame members via mechanical fastening devices commonly known in the art. The second frame part 142 is positioned beneath the first frame part 144 and includes a base 160 and an arm 162 extending outwardly from the base 160. The base 160 can be secured to the bottom wall 158 of the housing 110 via mechanical fastening devices commonly known in the art, and the arm 162 spans between the base 160 and the sub-housing 156 of the drive mechanism 130.

The drive mechanism 130 of the centering assembly 100 includes a motor 170 and a gear reducer or torque limiter 172. The motor 170 of the drive mechanism 130 can be, for example, an inverter motor in which a speed can be set; however, the drive mechanism can employ a motor, such as a servo motor, a stepping motor or the like, in which the speed, acceleration and deceleration of the motor can be precisely controlled. The motor 170 includes a drive shaft 174 (FIG. 9), and rotation of the motor drive shaft 174 is transmitted to the chuck 132 via the torque limiter 172 which is operatively engaged to the drive shaft of the motor. As is well known, the torque limiter 172 may limit the torque of the motor 170 by slipping (as in a friction plate slip-clutch) or by uncoupling the load entirely (as in a shear pin). The motor 170 is positioned on a bottom wall 176 of the sub-housing 156 adjacent a back wall 178 of the sub-housing 156. The torque limiter 172 is operably coupled to the drive shaft 174 of the motor and is located between the motor 170 and a supporting wall 180 of the sub-assembly 156. The torque limiter 172 includes an output shaft 186 which extends through an opening 188 provided in the supporting wall 180. A first gear 190 is mounted to an end of the output shaft 186. The first gear 190 is operatively engaged to a second gear 192. The second gear 192 is mounted on a drive shaft 194 of the chuck 132 and to a coupling 196 positioned in another opening 198 provided in the supporting wall 180. In the illustrated embodiment, the first and second gears 190, 192 provide a 1:1 gear ratio so that the rotational speed of the chuck 132 is the same as the rotational speed of the output shaft 186 of the torque limiter 172. Although, it should be appreciated that the drive mechanism 130 can include a gear assembly having a gear ratio adapted to decelerate or accelerate rotation of the drive shaft 194 of the chuck 132. It should also be appreciated that the drive mechanism 130 is not limited to a combination of gears such as the present embodiment, but can include a timing belt and pulleys, for example.

As depicted in FIGS. 3 and 4, a staking device 200 for marking the steering column 102 is housed in the sub-housing 156 and is located above the motor 170. The staking device includes a cylinder 202 which can be pressurized to move or displace a staking shaft 204 along a center axis 206 of the chuck. The cylinder 202 is supported in the sub-assembly 156 by a pair of laterally spaced supports 210, 212 mounted on respective pistons 216, 218. Each piston 216, 218 is moveably supported on a respective shafts 220, 222 having one end mounted to the back wall 178 of the sub-housing 156 and an opposite end secured to a support bracket 230. The bracket 190 is mounted to the supporting wall 180. The pistons 216, 218 can be displaced on the shafts 220, 222 by a model select device 232 secured to an outer surface of the back wall 178. It should be appreciated that the required axial displacement of the staking shaft 204 needed to mark the steering column 102 is dependent on the model of the vehicle being assembled. Therefore, the model select device 232 is adapted to longitudinally displace the pistons 216, 216, and this displacement moves the staking device 200 toward or away from the chuck 132.

Figure 5:
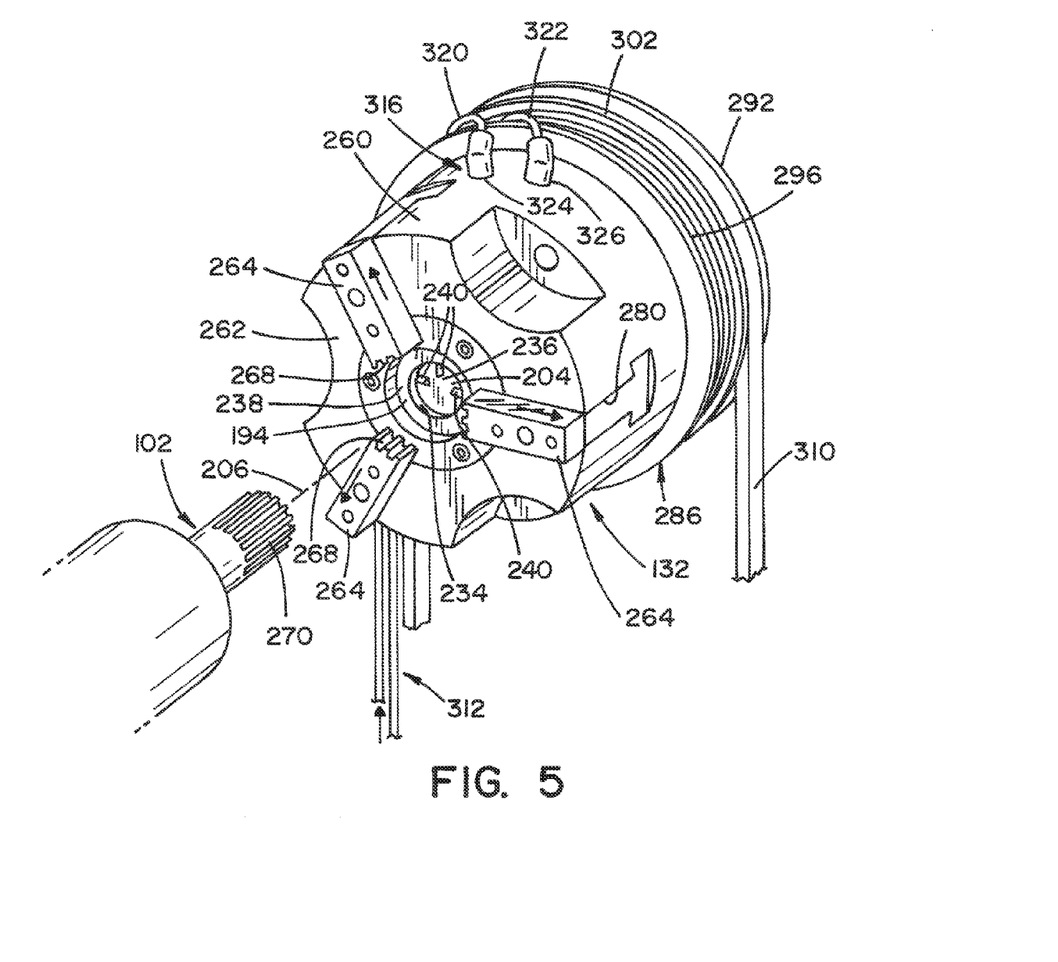
FIG. 5 is a perspective view of the chuck of the centering assembly prior to engagement with the steering column.
Figure 7:
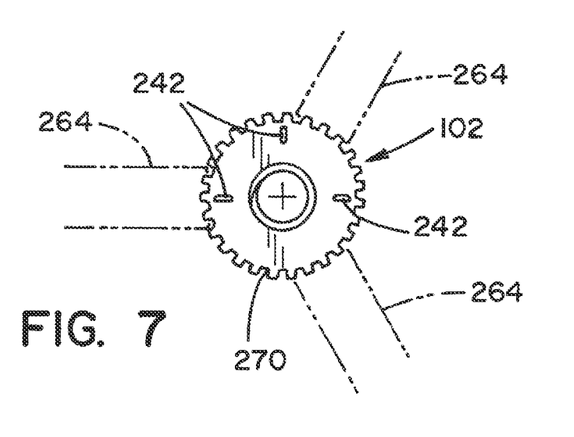
FIG. 7 depicts an end face of the steering column after being marked by the centering assembly.
Figure 8:
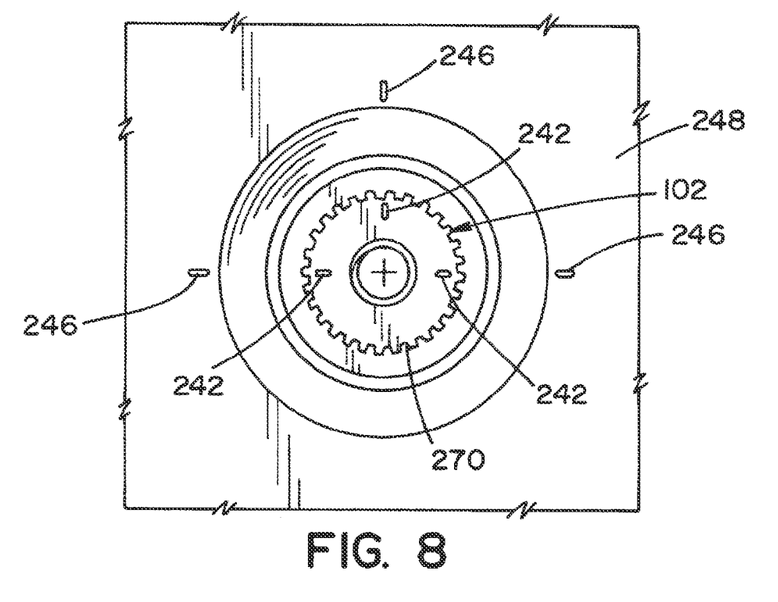
FIG. 8 depicts the alignment of a mount of a steering wheel on the marked steering column of FIG. 7.

As indicated above, the staking shaft 204 is displaceable along the center axis of the chuck 132. Particularly, the staking shaft 204 extends through the coupling 196 and the gear 192 and through an axial bore 234 (FIG. 5) of the drive shaft 194. In a rest position (FIG. 5) of the staking shaft 204, an end face 236 of the staking shaft 204 is offset inwardly from an end face 238 of the drive shaft 194. As shown in FIG. 5, the end face 236 of the staking shaft 204 includes at least one projection 240 for marking the steering column 102. In the depicted embodiment, three circumferentially spaced projections 240 are provided on the end face 236. It should be appreciated that engagement of the projections 240 with the steering column 102 produces corresponding marks 242 on the steering column 102 (FIG. 7). As shown in FIG. 8, the marks 242 on the steering column 102 can then be aligned with indicators 246 provided on a mount 248 of a steering wheel (not shown), which, in turn, ensures proper orientation of the steering wheel such that the steering wheel is positioned in a neutral rotary orientation (i.e., not turned left or right) when the vehicle is traveling straight ahead.

Figure 6:
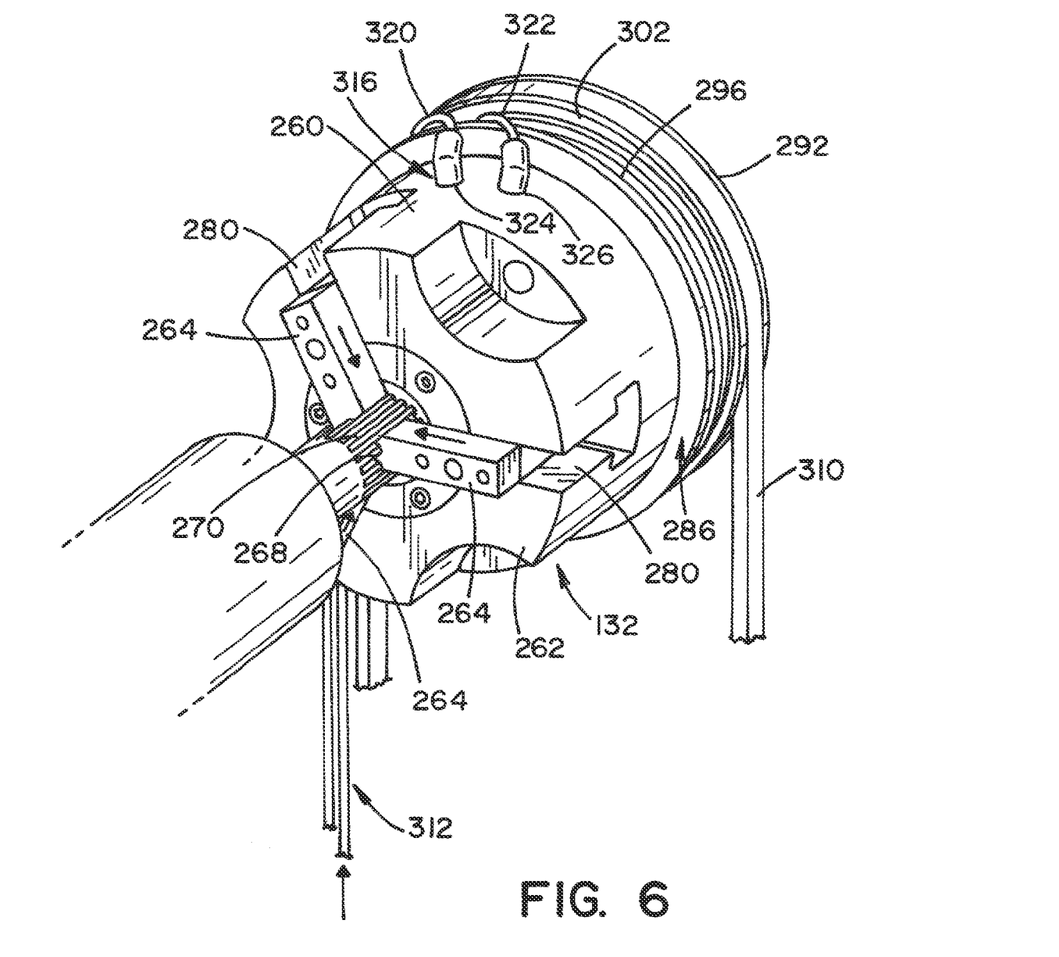
FIG. 6 is a perspective view of the steering assembly of FIG. 5 showing the chuck engaged to the steering column.

With reference to FIGS. 5 and 6, the chuck 132 includes an outer surface 260, an end face 262, and at least one gripper jaw 264 which is moveable radially relative to the center axis 206 of the chuck. The moveable gripper jaw 264 has a splined inner surface 268 for mating with a splined portion 270 of the steering column 102. According to one aspect of the chuck 132, the at least one gripper jaw 264 is a pair of circumferentially spaced moveable gripper jaws 264 each having a splined inner surface 268 for mating with the splined portion 270 of the steering column 102. According to another aspect of the chuck 132, and as depicted in FIGS. 5 and 6, the at least one gripper jaw 264 includes three circumferentially spaced moveable gripper jaws 264 each having a splined inner surface 268 for mating with the splined portion 270 of the steering column 102. Each gripper jaws 264 is radially moveable in a channel 280 located in the outer surface 260, and projects outwardly from the end face 262. As will be described below, air pressure supplied from the pneumatic mechanism 134 to the chuck 132 moves the gripper jaws 264 between an open position and a closed position so as to grip the splined portion 270 of the steering column 102.

With reference back to FIGS. 2 and 3, the pneumatic mechanism 134 includes a first driver pulley 286 and a second driven pulley 288 spaced from the first pulley and operably coupled thereto. The first pulley 286 is coupled to the driven shaft 194 of the chuck 132 and is rotated by the drive mechanism 130. The second pulley 288 is coupled to a rotatable air shaft 290 of the pneumatic mechanism 134 and is driven by the first pulley 286. Particularly, each of the first and second pulleys 286, 288 includes a respective first track 292, 294 and a respective second track 296, 298. The first and second tracks 292, 296 of the first pulley 286 are separated by an annular flange 302, and the first and second tracks 294, 298 of the second pulley 288 are separated by an annular flange 304. The first tracks 292, 294 of the first and second pulleys 286, 288, respectively, receive a timing belt 310 which allows for synchronous rotation of the first and second pulleys. The second tracks 296, 298 of the first and second pulleys 286, 288, respectively, receive at least one pneumatic hose 312 which is wound between the first and second pulleys 286, 288. The at least one pneumatic hose 312 is fluidly connected the air shaft 290, which, in turn, is fluidly connected to a source of pressurized air spaced from the pneumatic mechanism 134. It should be appreciated that a length of the at least one pneumatic hose 312 is such that pneumatic hose does not impede the clockwise and counterclockwise rotations of the chuck 132 during the centering process. For example, for certain vehicle models, the steering column 102 is rotate 600° clockwise and 600° during the centering process.

As best depicted in FIGS. 5 and 6, to supply pressurized air to the chuck 132 to move the gripper jaws 264 between the open and closed positions, the outer surface 260 of the chuck 132 includes at least one air port 316, and the at least one pneumatic hose 312 is connected to the at least one air port 316 for supplying air pressure to the chuck 132 from the source of pressurized air. In the depicted embodiment, the at least one pneumatic hose 312 includes a first pneumatic hose 320 and a second pneumatic hose 322, and the at least one air port 316 includes a first air port 324 having the first hose 320 connected thereto and a second air port 326 having the second hose 322 connected thereto. According to this aspect, the first hose 320 supplies air pressure from the air shaft 290 to the chuck 132 to move the gripper jaws 264 to the open position and the second hose 322 supplies air pressure from the air shaft 290 to the chuck 132 to move the gripper jaws 264 to the closed position. As indicated above, the second pulley 288 is mounted to the rotatable air shaft 290. To allow for rotation with the second pulley 288, the air shaft 290 is mounted to bearings 330 which are secured to the arm 162 of the second frame part 142. Air fittings 332 (only one fitting is depicted) are connected to the air shaft 290 and include a swivel which allows the fitting 332 to be fixed as the air shaft 290 rotates via the second pulley 288. Separate air hoses (not shown) are connected to the air fittings 332 and to the source of pressurized air.

Figure 9:
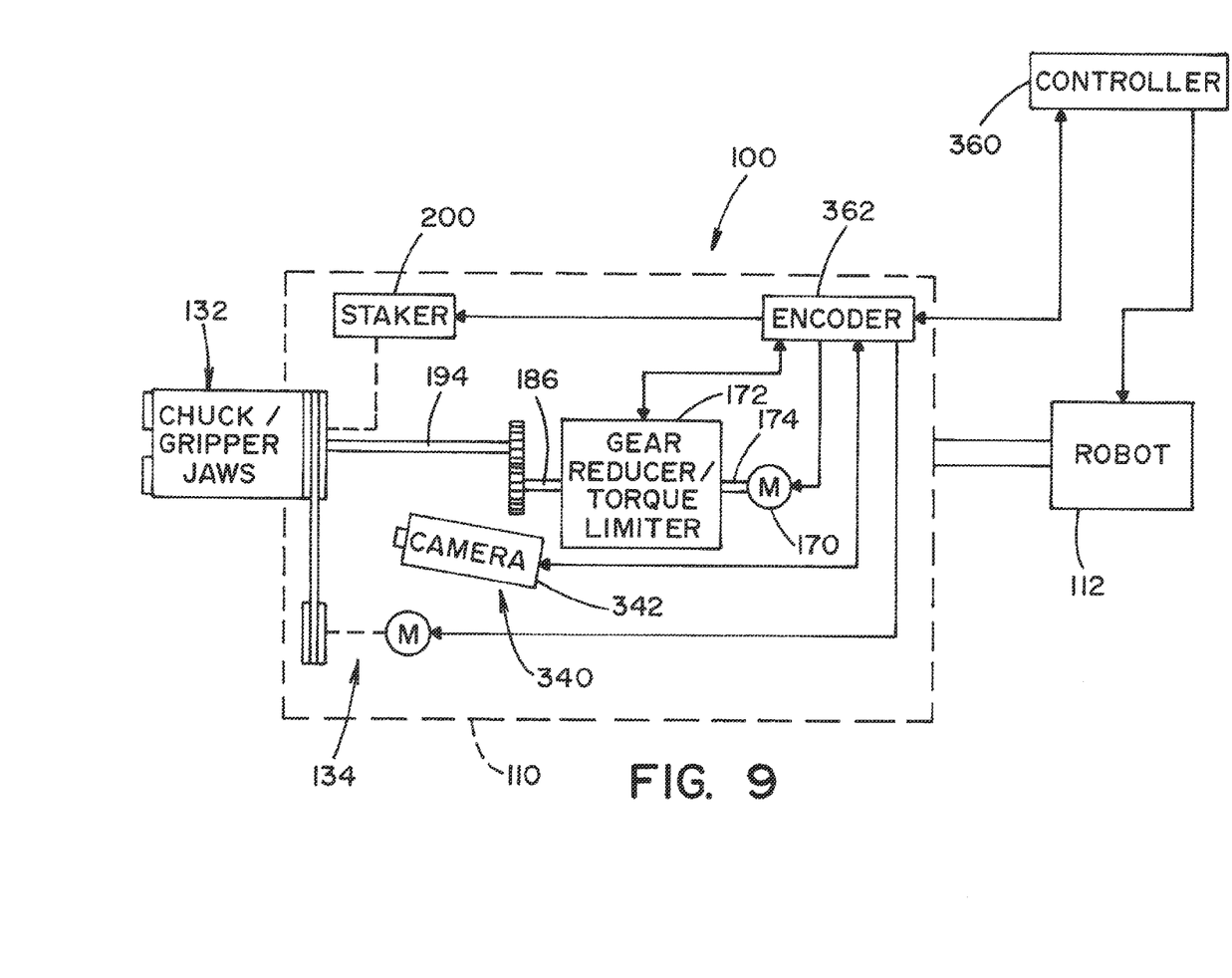
FIG. 9 is a schematic view of the automated vehicle steering centering assembly of FIG. 1.

With reference now to FIGS. 2 and 9, the centering assembly 100 further includes a vision system 340 mounted to the housing 110 for detecting the location of the steering column 102. The vision system 340 can include a camera 342 mounted to a third frame part 346 of the housing. The third frame part 346 can include side frame members 350, 352 and a base frame member 354 interconnecting the side frame members. As depicted, the side frame member 350, 352 can be mounted to one of the first frame part 140 and the sub-housing 156 via mechanical fastening devices commonly known in the art. As shown in FIG. 3, the base frame member 354 is spaced from the back wall 178 of the sub-housing 156 and together with the back wall 178 at least partially encloses the model select device 232. The focal point of the camera 342 is spaced a predetermined distance from the center axis 206 of the chuck 132. With this arrangement, as the robotic arm 112 moves the centering assembly 100 toward the steering column 102, the steering column is first detected by the camera 342. The camera is in signal communication with a controller 360 and upon detection of the steering column 102, the controller 350 communicates with the robotic arm 112. The robotic arm 112 then moves the predetermined distance which substantially aligns the center axis 206 of the chuck with the steering column 102. The controller 360 may take the form of any processing unit, such as a computer processing unit. Further, the controller 360 may be a single processing unit, or may take the form of multiple processing units. With the use of the vision system 340 and the pneumatically operated chuck 132, an exact alignment of the chuck to the steering column is not required.

The centering assembly 100 further includes an encoder 362 associated with the drive mechanism 130 for detecting clockwise and counterclockwise rotations of the chuck 132 during the centering process. The encoder 362 is in signal communication with the controller 360, and based on the signals received from the encoder 362 the controller 360 calculates a center of a steering span of the steering column 112. The controller 360 can then communicate with the staking device 200 mounted to the housing 110 to mark the center position of the steering column.

The present disclosure further provides a method of automatically centering a steering column 102 of a vehicle. The method includes moving an automated centering assembly 100 toward the steering column 102. As indicated above, the centering assembly 100 includes the chuck 132 having at least two moveable gripper jaws 264 each having a splined inner surface 268 for mating with a splined portion 270 of the steering column 102, the drive mechanism 130 for rotating the chuck, and the pneumatic mechanism 134 for moving each gripper jaw 264 between an open position and a closed position. The method includes positioning the chuck 132 on the steering column 102; rotating the chuck 132 together with the steering column 102 in both a clockwise direction and a counterclockwise direction; detecting the clockwise and counterclockwise rotations of the chuck 132; and calculating a center of a steering span of the steering column 102.

The positioning step includes locating the steering column 102 via a vision system 340, pneumatically moving the gripper jaws 264 to the open position, positioning the opened gripper jaws 264 over the splined portion 270 of the steering column 102, and pneumatically moving the gripper jaws 264 to the closed position. The method further includes automatically marking the steering column 102 once the center of the steering span is calculated with the staking device 200 having the staking shaft 204 displaceable along a center axis of the chuck 132.

While, for purposes of simplicity of explanation, the method has steps described as executing serially, it is to be understood and appreciated that the present disclosure is not limited by the illustrated order, and some steps could occur in different orders and/or concurrently with other steps from that shown and described herein.

It is to be appreciated that particular elements or components described herein may have their functionality suitably implemented via hardware, software, firmware or a combination thereof. For example, the controller and/or encoder may be implemented as appropriate hardware circuits or alternately as microprocessors programmed to implement their respective functions. Additionally, it is to be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An automated vehicle steering centering assembly for a centering process for marking a center of a steering column, the automated vehicle steering centering assembly comprising:
   a housing connected to an associated robotic arm for movement therewith;
   a drive mechanism mounted to the housing;
   a chuck rotatably connected to the drive mechanism, the chuck including a moveable gripper jaw having a splined inner surface for mating with a splined portion of the steering column; and
   a pneumatic mechanism mounted to the housing and operably connected to the chuck, wherein air pressure supplied from the pneumatic mechanism to the chuck moves the gripper jaw between an open position and a closed position so as to grip the steering column.

2. The assembly of claim 1, wherein the drive mechanism includes a motor and a torque limiter, rotation of a drive shaft of the motor is transmitted to the chuck via the torque limiter operably engaged to the drive shaft of the motor.

3. The assembly of claim 1, wherein the pneumatic mechanism includes a first driver pulley and a second driven pulley spaced from the first pulley and operably coupled thereto, the first pulley is coupled to a driven shaft of the chuck and is rotated by the drive mechanism and the second pulley is coupled to a rotatable air shaft of the pneumatic mechanism and is driven by the first pulley.

4. The assembly of claim 3, wherein each of the first and second pulleys includes a first track and a second track, the first tracks of the first and second pulleys receive a timing belt, and the second tracks of the first and second pulleys receive at least one pneumatic hose.

5. The assembly of claim 3, wherein an outer surface of the chuck includes at least one air port, the at least one pneumatic hose is connected to the at least one air port for supplying air pressure to the chuck.

6. The assembly of claim 1, wherein the housing includes a frame having a first frame part mounted to the drive mechanism and a second frame part mounted to the pneumatic mechanism.

7. The assembly of claim 1, further including a vision system mounted to the housing for detecting the steering column.

8. The assembly of claim 7, wherein the vision system includes a camera mounted to the housing and spaced a predetermined distance from a center axis of the chuck.

9. The assembly of claim 1, wherein the drive mechanism further includes an encoder for detecting clockwise and counterclockwise rotations of the chuck during the centering process, and further including a controller in communication with the encoder for calculating a center of a steering span of the steering column.

10. The assembly of claim 1, wherein the chuck includes at least two moveable gripper jaws each having a splined inner surface for mating with a splined portion of the steering column.

11. An automated vehicle steering centering assembly for a centering process for marking a center of a steering column, the automated vehicle steering centering assembly comprising:
   a robotic arm;
   a housing connected to the robotic arm for movement therewith;
   a drive mechanism mounted to the housing;
   a chuck rotatably connected to the drive mechanism, the chuck including at least two moveable gripper jaws each having a splined inner surface for mating with a splined portion of the steering column; and
   a pneumatic mechanism mounted to the housing and operably connected to the chuck, the pneumatic mechanism including a first driver pulley operably coupled to the chuck and a second driven pulley mounted on an air shaft and rotatably coupled to the first pulley, wherein air pressure supplied from the pneumatic mechanism to the chuck moves each gripper jaw between an open position and a closed position which allows the gripper jaws to engage the steering column.

12. The assembly of claim 11, wherein each of the first and second pulleys includes a first track and a second track, the first tracks of the first and second pulleys receive a timing belt, and the second tracks of the first and second pulleys receive at least one pneumatic hose.

13. The assembly of claim 12, wherein an outer surface of the chuck includes at least one air port and the at least one pneumatic hose is connected to the at least one air port for supplying air pressure to the chuck.

14. The assembly of claim 13, wherein the at least one pneumatic hose includes a first pneumatic hose and a second pneumatic hose, and the at least one air port includes a first air port having the first hose connected thereto and a second air port having the second hose connected thereto, the first hose supplying air pressure to the chuck to move the gripper jaws to the open position and the second hose supplying air pressure to the chuck to move the gripper jaws to the closed position.

15. The assembly of claim 11, wherein the assembly further includes a vision system including a camera mounted to the housing for detecting the steering column, the camera is spaced a predetermined distance from a center axis of the chuck.

16. The assembly of claim 11, wherein the drive mechanism includes an encoder for detecting clockwise and counterclockwise rotations of the chuck during the centering process, and further including a controller in communication with the encoder for calculating a center of a steering span of the steering column.

17. The assembly of claim 16, further including a staking device mounted to the housing and in communication with the controller for marking the steering column, the staking device including a staking shaft which is displaceable along a center axis of the chuck.

18. A method of automatically centering a steering column of a vehicle comprising:
   moving an automated centering assembly toward the steering column, the centering assembly including a chuck having at least two moveable gripper jaws each having a splined inner surface for mating with a splined portion of the steering column, a drive mechanism for rotating the chuck, and a pneumatic mechanism for moving each gripper jaw between an open position and a closed position;
   positioning the chuck on the steering column;
   rotating the chuck together with the steering column in both a clockwise direction and a counterclockwise direction;
   detecting the clockwise and counterclockwise rotations of the chuck; and
   calculating a center of a steering span of the steering column.

19. The method of claim 18, wherein the positioning step includes locating the steering column via a vision system, pneumatically moving the gripper jaws to the open position, positioning the opened gripper jaws over the splined portion of the steering column, and pneumatically moving the gripper jaws to the closed position.

20. The method of claim 18, further including automatically marking the steering column once the center of the steering span is calculated with a staking shaft displaceable along a center axis of the chuck.

* * * * *